United States Patent
Poulin et al.

(10) Patent No.: US 6,290,020 B1
(45) Date of Patent: Sep. 18, 2001

(54) MOTOR VEHICLE TRANSMISSION MAIN SHAFT, CORRESPONDING TRANSMISSION DEVICE AND MOTOR VEHICLE TRANSMISSION

(75) Inventors: Bernard Poulin, deceased, late of Cergy le Haut, by Anne-Marie Aline Claude Joassard, Vincent Yves Poulin, Eric Francois Claude Poulin, Delphine Claude Christine Poulin legal representives; Frederic Declas, Paris; Michel Margerie, Vetheuil, all of (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/155,926

(22) PCT Filed: Apr. 16, 1997

(86) PCT No.: PCT/FR97/00687
  § 371 Date: Jan. 25, 1999
  § 102(e) Date: Jan. 25, 1999

(87) PCT Pub. No.: WO97/39909
  PCT Pub. Date: Oct. 30, 1997

(30) Foreign Application Priority Data
  Apr. 23, 1996 (FR) .................................................. 96 05108

(51) Int. Cl.⁷ .................................................. B60K 17/00
(52) U.S. Cl. ........................ 180/375; 180/379; 180/380
(58) Field of Search .................................. 180/297, 359, 180/353, 354, 360, 374, 375, 376, 378, 379, 380, 383, 384, 385

(56) References Cited

U.S. PATENT DOCUMENTS

| | | | |
|---|---|---|---|
| 2,906,360 | * 9/1959 | Daley, Jr. | 180/384 |
| 2,909,233 | * 10/1959 | Kozub | 180/379 |
| 4,365,686 | * 12/1982 | Orain . | |
| 4,403,676 | * 9/1983 | Fujii et al. | 180/297 |
| 4,413,701 | * 11/1983 | Kumagai | 180/379 |
| 4,421,187 | 12/1983 | Shibata et al. . | |
| 4,427,085 | * 1/1984 | Aucktor | 180/385 |
| 4,476,950 | * 10/1984 | Welschof | 180/384 |
| 4,771,842 | * 9/1988 | Mishio et al. | 180/383 |
| 4,787,468 | * 11/1988 | Kobayashi | 180/375 |
| 4,796,722 | * 1/1989 | Kumagai | 180/375 |
| 5,868,517 | * 2/1999 | Aoki et al. . | |

FOREIGN PATENT DOCUMENTS

| 2619879 | 3/1989 | (FR) . |
|---|---|---|
| 2209380 A | * 5/1989 | (GB) . |

* cited by examiner

Primary Examiner—J. J. Swann
Assistant Examiner—Christopher Battorff
(74) Attorney, Agent, or Firm—Howard & Howard

(57) ABSTRACT

An intermediate shaft includes, as a single piece (12), a female element (13B) of sliding articulated joint (7B), an internal raceway (15), and a tubular part (16) which stretches, from this raceway, in the opposite direction to the female element.

11 Claims, 3 Drawing Sheets

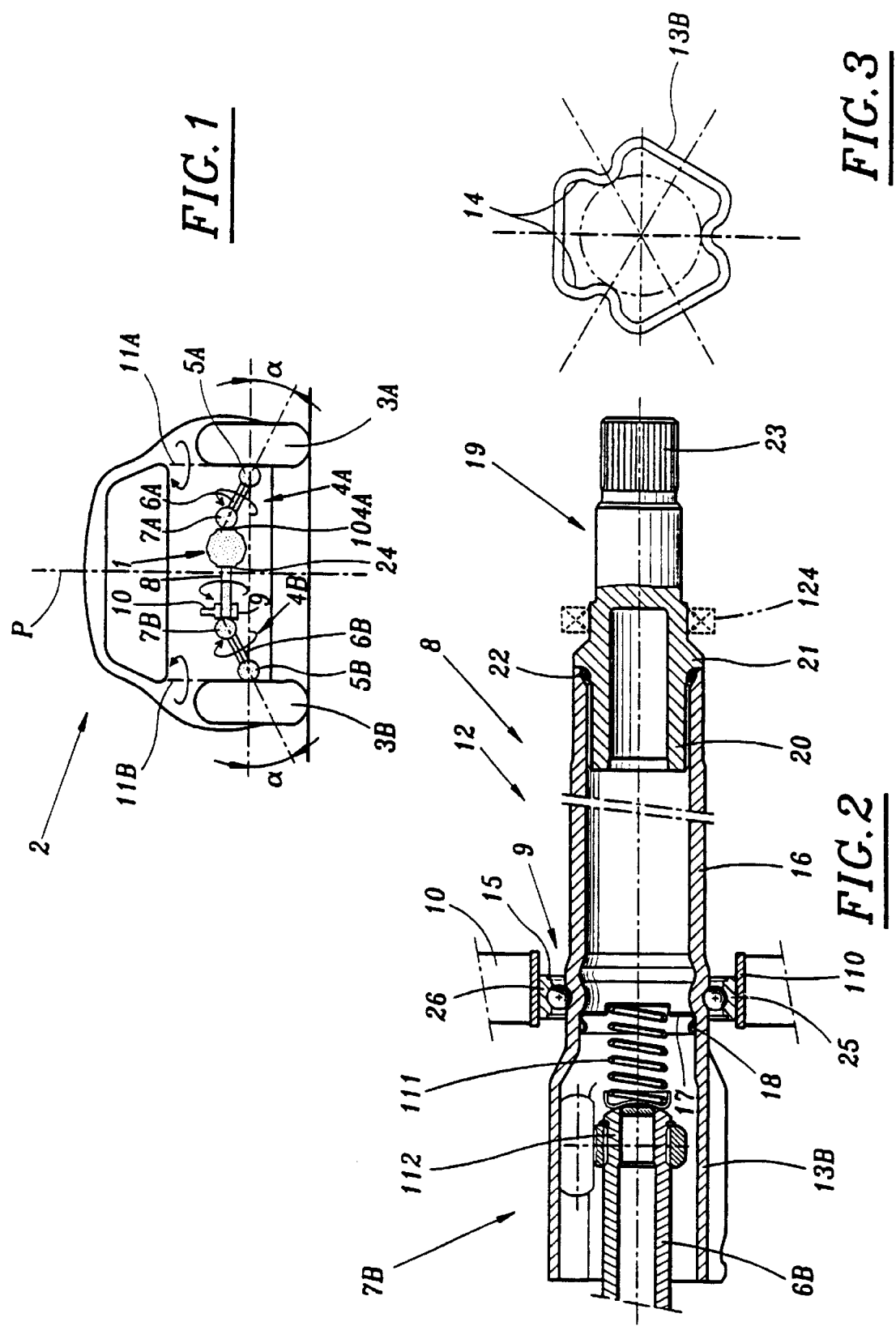

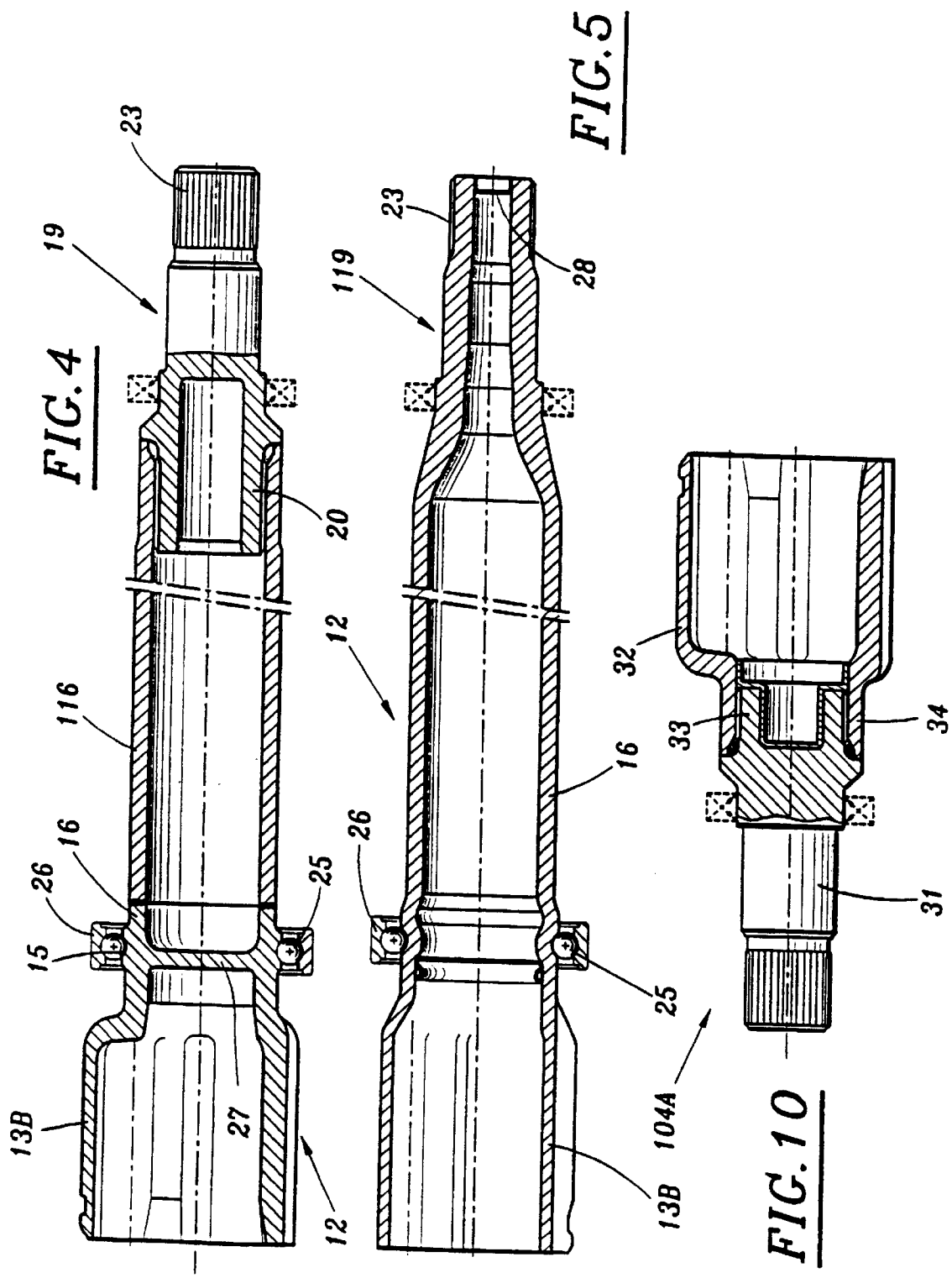

MOTOR VEHICLE TRANSMISSION MAIN SHAFT, CORRESPONDING TRANSMISSION DEVICE AND MOTOR VEHICLE TRANSMISSION

The present invention relates to an intermediate shaft for motor vehicle transmission. It applies particularly to front-wheel drive motor vehicles.

In front-wheel drive motor vehicles, the gearbox/differential assembly is generally offset with respect to the longitudinal plane of symmetry of the vehicle.

To make the manufacture of transmissions more rational, it has been proposed to use, on the one hand, two identical transmission parts arranged symmetrically and, on the other hand, an intermediate shaft connecting the corresponding output of the said differential to the furthest transmission part. The intermediate shaft is supported by a bearing itself borne by the motive power unit or alternatively by the structure of the vehicle.

The object of the invention is to provide a low-weight intermediate shaft which is economical to produce and has high stiffness.

To this end, the subject of the invention is an intermediate shaft for motor vehicle transmission, comprising, as a single piece, (a) a female element of a sliding articulated joint, (b) an internal raceway, and (c) a tubular part which extends, from this raceway, in the direction opposite to the said female element.

The intermediate shaft according to the invention may include one or more of the features of claims 2 to 7.

Another subject of the invention is a transmission device for a motor vehicle, comprising an intermediate shaft as defined hereinabove, according to claim 8.

Two embodiments of this transmission device are described in claims 9 and 10, respectively.

A further subject of the invention is a transmission for a motor vehicle, according to claim 11.

Embodiments of the invention will now be described with respect to the attached drawings, in which:

FIG. 1 represents diagrammatically, viewed from the front and in transverse section, a motor vehicle equipped with a transmission in accordance with the invention;

FIG. 2 is a view in longitudinal section of a first embodiment of the intermediate shaft of the transmission of FIG. 1;

FIG. 3 is an end-on view of the intermediate shaft;

FIG. 4 is a view similar to FIG. 2 of a first alternative form;

FIG. 5 is a view similar to FIG. 2 of a second alternative form;

FIG. 10 represents, in longitudinal section, a differential output assembly of the transmission.

FIG. 1 depicts the gearbox/differential 1 of a front-wheel motor vehicle 2. This unit is offset laterally, towards the right in the drawing, with respect to the longitudinal plane of symmetry P of the vehicle.

Figure 6:
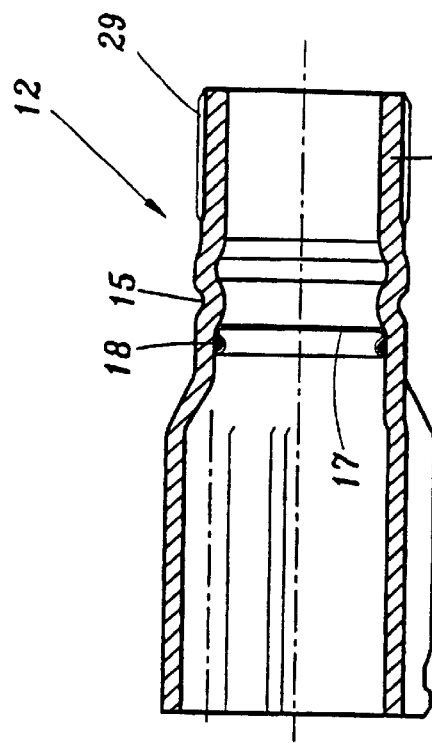
FIG. 6 is a view in longitudinal section of a piece which forms part of another embodiment of the intermediate shaft according to the invention.

The unit 1 is connected to the two front wheels by a transmission which comprises:

for the left-hand wheel 3A, closest to the unit 1, on the one hand, a transmission part 4A and, on the other, a connecting assembly 104A represented in FIG. 10 and described later. The transmission part 4A consists of a fixed constant-velocity joint 5A adjacent to the wheel, of a connecting shaft 6A and, at the inboard end of this shaft, of the male element of a sliding constant-velocity joint 7A;

for the right-hand wheel 3B, furthest from the unit 1: on the one hand, a transmission part 4B identical to the transmission part 4A, that is to say consisting of a fixed constant-velocity joint 5B adjacent to the wheel, of a connecting shaft 6B and of the male element of a sliding constant-velocity joint 7B; and on the other hand an intermediate shaft 8 which connects the corresponding output of the differential to the male element in question.

In this example, the joints 7A and 7B are sliding joints of the tripot type, while the joints 5A and 5B are fixed joints which may also be tripot joints or alternatively ball-type joints.

The transmission parts 4A and 4B are symmetric with respect to the plane P. The shafts 6A and 6B are inclined by one and the same angle a with respect to their wheel stub axles.

Near the joint 7B, the intermediate shaft 8 is supported by a ball bearing 9 which is itself borne by a support partition 10 fixed to the motive power unit.

Arrows have been used in FIG. 1 to give a diagrammatical representation of the rotation of the three shafts 6A, 6B and 8, and of the pivoting of the wheels about their respective axes of pivoting 11A, 11B.

FIGS. 2 and 3 represent a first embodiment of the intermediate shaft 8, which comprises two main pieces.

The first piece 12 is a tubular piece which forms, from left to right, the bell-shaped pot or bowl 13B of the sliding joint 7B, with its six runway tracks 14 (FIG. 3), which is intended to take the male element of the joint then, in a region which is deformed radially inwards, the internal raceway 15 of the ball bearing 9, then a tubular part 16 of constant circular section. This part 16 is, however, fitted at its free end with internal splines. The end of the bell-shaped pot 13B is hermetically closed by a sheet metal cup 17 fitted with a peripheral annular seal 18.

The second piece 19 of the intermediate shaft 8 is a connecting end piece of which an externally splined end part 20 is fitted into the splined end part of the piece 12, the end piece including an external collar 21 which presses against the end face of the part 12. An annular seal 22 is arranged in an internal chamfer of the piece 12 and compressed by the collar 21. The opposite end 23 of the end piece 19 is splined and fits into an output orifice 24 (FIG. 1) of the differential, which orifice is fitted with a seal 124 represented in dotted line in FIG. 2.

Also represented in FIG. 2 are the balls 25 of the bearing 9 and the external race 26 thereof, this race being mounted so that it can slide freely in a circular opening 110 of the support partition 10 of FIG. 1.

When the transmission is assembled, the end piece 19 is in axial abutment within the differential, and the piece 12 is urged elastically against the collar 21 of the end piece by a coil spring 111 which is compressed between the cup 17 and the end 112 of the shaft 6B of the tripod of the joint 7B.

The intermediate shaft thus described is rigid, lightweight and economical to produce. In particular, the piece 12 may be obtained by cold deformation of a tubular blank, then grinding of the runway track 15 in a single pass.

The alternative form of FIG. 4 differs from the previous one only in the following respects:

the tubular part 16 of the piece 12 is of short length, and is extended by a tube 116 of the same section which is connected to it by buttwelding;

the internal raceway 15 is produced by external machining on the piece 12 in line with the transverse partition 27 formed integrally with this piece. As this partition achieves the leaktight closure of the bell-shaped pot 13B, the cup 17 is omitted.

In this alternative form of FIG. 4, the piece 12 may be produced by forging.

The alternative form of FIG. 5 differs from that of FIG. 2 only by the fact that the tubular part 16 is extended to form an integral tubular end piece 119 which has the splines 23 at its end. In this case, a cup 28 hermetically closes the free end of the end piece 119.

Figure 7:
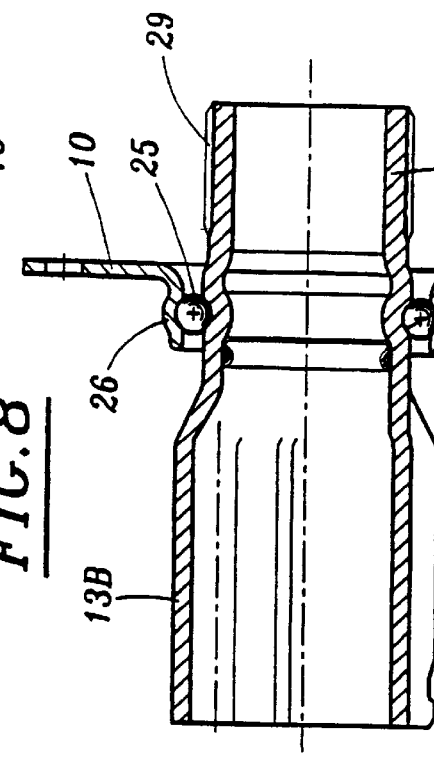
FIG. 7 is a similar view showing the piece of FIG. 6 mounted in a support member.

In the embodiment of FIGS. 6 and 7, the piece 12 of the intermediate shaft is the same as that of FIG. 2, apart from the fact that the tubular part 16 is of short length. The internal splines 29 of this tubular part take the splined end (not represented) of a complementary piece of the intermediate shaft.

As may be seen in FIG. 7, the external race 26 of the bearing 9 may be formed integrally with the support partition 10, in the form of a flange which has an internal circular groove in which an external runway for the balls 25 is ground.

Figure 8:
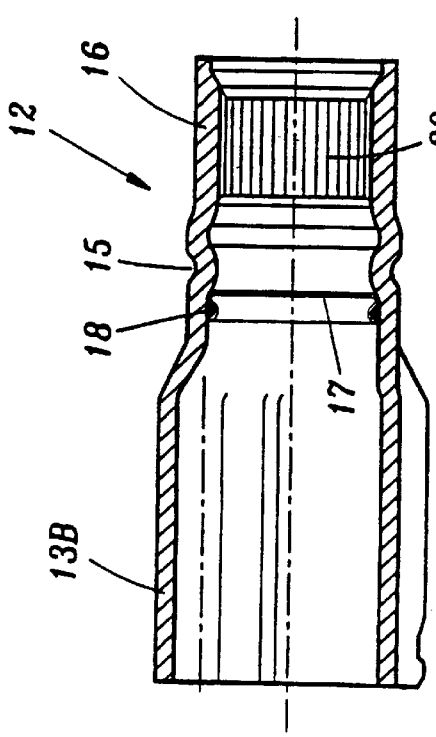
FIGS. 8 and 9 are views which correspond respectively to FIGS. 6 and 7 but which relate to an alternative form.
Figure 9:
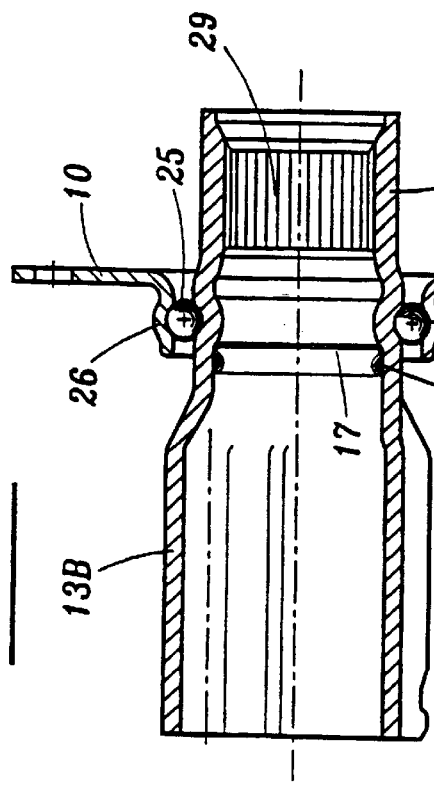

The alternative form of FIGS. 8 and 9 is identical to that of FIGS. 6 and 7 apart from the fact that the splines 29 of the tubular part 16 are external splines. In this case, the part 16 fits into the internally splined end of the complementary piece of the intermediate shaft.

Each of the embodiments of the intermediate shaft described hereinabove incorporates the bell-shaped pot of the transmission joint 7B. The transmission part 4B therefore ends, on the vehicle inboard side, in the complementary tripod. Likewise, the symmetric transmission part 4A ends, on the inboard side, in a tripod, and the corresponding output of the differential is equipped, before this transmission part is mounted, with an assembly consisting of a splined end piece and of a bell-shaped pot taking this tripod, for example such as the assembly 104 comprising two parts—the splined end piece 31 and the bell-shaped pot 32—represented in FIG. 10. The end piece 31 is similar to the end piece 19 of FIG. 2 and includes a splined part 33 which fits into a splined extension 34 of the bell-shaped pot 32.

What is claimed is:

1. An intermediate shaft for motor vehicle transmission, comprising, as a single piece, (a) a female element of a sliding articulated joint, (b) a bearing internal raceway, said internal raceway being provided on an external surface of said shaft in a position longitudinally adjacent said female element, and (c) a tubular part which extends, from said raceway, in a direction opposite to said female element, characterized in that the internal raceway (15) is produced by machining on the exterior of said piece and produced in line with a transverse partition (27) of said piece (12).

2. An intermediate shaft for motor vehicle transmission, comprising, as a single piece, (a) a female element of a sliding articulated joint, (b) a bearing internal raceway, said internal raceway being provided on an external surface of said shaft in a position longitudinally adjacent said female element, and (c) a tubular part which extends, from said raceway, in a direction opposite to said female element, characterized in that said piece (12) forms, at an end of said tubular part (16), a connecting end piece (119) formed integrally with it.

3. An intermediate shaft for motor vehicle transmission, comprising, as a single piece, (a) a female element of a sliding articulated joint, (b) a bearing internal raceway, said internal raceway being provided on an external surface of said shaft in a position longitudinally adjacent said female element, and (c) a tubular part which extends, from said raceway, in a direction opposite to said female element, characterized in that it includes a separate connecting end piece (19) which is arranged at an end of said tubular part (16).

4. An intermediate shaft for a motor vehicle transmission, comprising, as a single piece (12), (a) a female element (13B) of a sliding articulated joint (7B), (b) an internal raceway (15) produced by machining on an exterior of said piece (12) and in line with a transverse partition (27) of said piece (12), and (c) a tubular part (16) which extends, from said raceway, in a direction opposite to said female element (13B).

5. An intermediate shaft according to claim 4, characterized in that said female element (13B) comprises a bell-shaped bowl of a sliding articulated tripot joint.

6. An intermediate shaft for a motor vehicle transmission, comprising, as a single piece (12), (a) a female element (13B) of a sliding articulated joint (7B), (b) an internal raceway (15), and (c) a tubular part (16) which extends from said raceway in a direction opposite to said female element and wherein said piece (12) forms at an end of said tubular part (16) a connecting end piece (119) formed integrally with said tubular part.

7. An intermediate shaft according to claim 6 wherein said connecting end piece comprises a splined connecting end piece.

8. An intermediate shaft for a motor vehicle transmission, comprising, as a single piece (12), (a) a female element (13B) of a sliding articulated joint (7B), (b) an internal raceway (15), (c) a tubular part (16) which extends from said raceway in a direction opposite to said female element, and a separate connecting end piece (19) arranged at an end of said tubular part (16).

9. An intermediate shaft according to claim 8 wherein said separate connecting end piece comprises a splined separate connecting end piece.

10. A transmission device for a motor vehicle comprising:

an intermediate shaft (8) comprising, as a single piece (12), (a) a female element (13B) of a sliding articulated joint (7B), (b) an internal raceway (15), and (c) a tubular part (16) which extends from said internal raceway in a direction opposite to said female element;

a support member (10) for supporting said shaft, and intended to be fixed to a motor power unit or to a structure of a vehicle;

an external race (26) slideably mounted in an opening (110) of said support member (10);

rolling elements (25) interposed between said external race and said internal raceway of said intermediate shaft; and means (111) elastically axially urging said intermediate shaft (8) in a direction opposite to said female element (13B).

11. Transmission device according to claim 10, characterized in that the external race (26) is formed integrally with the support member (10).

* * * * *